United States Patent
Wang et al.

(10) Patent No.: US 12,508,345 B2
(45) Date of Patent: Dec. 30, 2025

(54) METHOD FOR PREPARING ARTIFICIAL LIGAMENT WITH HIGH TENSILE DURABILITY, ANTI-FATIGUE, LOW CREEP AND STRESS RELAXATION RATE, ARTIFICIAL LIGAMENT PREPARED THEREFROM, AND FIBER COLLECTION PLATFORM BY INTERFACIAL POLYELECTROLYTE COMPLEXATION SPINNING

(71) Applicant: National Tsing Hua University, Hsinchu (TW)

(72) Inventors: Tzu-Wei Wang, Hsinchu (TW); Yu-Chung Liu, Hsinchu (TW); Hao-Xuan Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 216 days.

(21) Appl. No.: 18/332,408

(22) Filed: Jun. 9, 2023

(65) Prior Publication Data
US 2024/0316245 A1    Sep. 26, 2024

(30) Foreign Application Priority Data
Mar. 20, 2023    (TW) .................. 112110195

(51) Int. Cl.
A61L 27/26    (2006.01)
A61L 27/20    (2006.01)
A61L 27/22    (2006.01)
A61L 27/24    (2006.01)
A61L 27/50    (2006.01)

(52) U.S. Cl.
CPC ............... *A61L 27/26* (2013.01); *A61L 27/20* (2013.01); *A61L 27/227* (2013.01); *A61L 27/24* (2013.01); *A61L 27/505* (2013.01); *A61L 2430/10* (2013.01)

(58) Field of Classification Search
CPC ...... A61L 27/227; A61L 27/505; A61L 27/26; A61L 27/20; A61L 27/24; A61L 2430/10
See application file for complete search history.

(56) References Cited

PUBLICATIONS

Wan, Andrew C.A., Marie F.A. Cutiongco, Benjamin C.U.Tai, Meng Fatt Leong, Hong Fang Lu, Evelyn K.F. Kim. "Fibers by interfacial polyelectrolyte complexation-processes, materials, and applications". Oct. 2016. Materials Today, vol. 19, No. 8. pp 437-450.*

* cited by examiner

*Primary Examiner* — Monica A Huson
(74) *Attorney, Agent, or Firm* — MUNCY, GEISSLER, OLDS & LOWE, P.C.

(57) ABSTRACT

The present disclosure provides a method for preparing an artificial ligament with high tensile durability, anti-fatigue, low creep and stress relaxation rate, the artificial ligament prepared therefrom, and a fiber collection platform by interfacial polyelectrolyte complexation spinning. The present disclosure uses interfacial polyelectrolyte complexation spinning process, and equips with the self-designed fiber collection machine to produce micron and millimeter-scale fibers. Combing through the weaving method, it is made into a tailor-made artificial substitute, which is applied to artificial ligaments with high tensile strength and durability, anti-fatigue, and low creep and stress relaxation rate.

9 Claims, 8 Drawing Sheets

METHOD FOR PREPARING ARTIFICIAL LIGAMENT WITH HIGH TENSILE DURABILITY, ANTI-FATIGUE, LOW CREEP AND STRESS RELAXATION RATE, ARTIFICIAL LIGAMENT PREPARED THEREFROM, AND FIBER COLLECTION PLATFORM BY INTERFACIAL POLYELECTROLYTE COMPLEXATION SPINNING

CROSS-REFERENCE TO RELATED APPLICATION

This application claims priority of Taiwan patent application No. 112110195, filed on Mar. 20, 2023, the content of which is incorporated herein in its entirety by reference.

BACKGROUND OF THE INVENTION

1. Field of the Invention

The present invention relates to a method for preparing an artificial ligament with high tensile durability, anti-fatigue, low creep and stress relaxation rate, the artificial ligament prepared therefrom, and a fiber collection platform by interfacial polyelectrolyte complexation spinning.

2. The Prior Art

Natural ligament is affected by the low density of blood vessels and cells in the tissue. After injury, nutrients, oxygen and other substances cannot be transported to the damaged part in a short period of time, which often leads to poor self-repair ability of the ligament. Currently, artificial ligaments are limited by their material properties, and artificial substitutes often fail to promote the regeneration and repair of the original tissue, often resulting in fatigue relaxation or re-fracture after long-term use. In addition, artificial substitutes also have biocompatibility issues to be resolved, such as poor integration with tissues, resulting in bone tunnel expansion.

In the past few decades, the fiber-based biomedical materials were mainly electrospinning and 3D braided scaffolds. Although the above methods are the most commonly used spinning techniques in research, the reaction conditions (high temperature, high voltage, organic solvent, etc.) often cause problems such as reduced cell survival rate, reduced bioactivity of therapeutic factors, and poor biocompatibility, limiting the application in the field of biomedicine.

In order to solve the above-mentioned problems, those skilled in the art urgently need to develop a novel method for preparing an artificial ligament with high tensile durability, anti-fatigue, low creep and stress relaxation rate, the artificial ligament prepared therefrom, and a fiber collection platform by interfacial polyelectrolyte complexation spinning for the benefit of a large group of people in need thereof.

SUMMARY OF THE INVENTION

A primary objective of the present invention is to provide a method for preparing an artificial ligament, comprising the following steps: (a) forming an artificial ligament fiber through interfacial polyelectrolyte complexation spinning (IPC spinning) process, wherein the artificial ligament fiber is formed by spinning on a fiber collection platform by the interfacial polyelectrolyte complexation spinning process using a positively charged poly(amino acids) polymer material and a negatively charged polysaccharide polymer material; (b) weaving the artificial ligament fiber using a twisted weaving method to form an artificial fiber bundle; (c) using a crosslinking agent to strengthen the artificial fiber bundle, thereby forming a strengthened artificial fiber bundle; and (d) performing a mineralization gradient on the strengthened artificial fiber bundle, and using a protein as a sheath for coating layer, thereby forming the artificial ligament with its fundamental characteristics and structure; wherein in step (a), the positively charged poly(amino acids) polymer material and the negatively charged polysaccharide polymer material are respectively in a form of positively charged droplets and negatively charged droplets, and the positively charged poly(amino acids) polymer material and the negatively charged polysaccharide polymer material are dropped on the fiber collection platform, and the artificial ligament fiber is fabricated by contact of the positively charged droplets and the negatively charged droplets through pulling upward.

According to an embodiment of the present invention, the positively charged poly(amino acids) polymer material is α-poly-D-lysine (PDL).

According to an embodiment of the present invention, the negatively charged polysaccharide polymer material is pectin.

According to an embodiment of the present invention, in step (b), the twisted weaving method is formed by twisting five strands at 45°/cm.

According to an embodiment of the present invention, in step (c), the crosslinking agent comprises N-(3-Dimethylaminopropyl)-N'-ethyl carbodiimide (EDC) and N-hydroxysuccinimide (NHS).

According to an embodiment of the present invention, in step (d), the protein is type I collagen.

According to an embodiment of the present invention, in step (d), the mineralization gradient is performed by adding calcium hydroxide and diammonium hydrogen phosphate solution to form hydroxyapatite.

According to an embodiment of the present invention, an amount of the positively charged droplets or the negatively charged droplets is five drops.

According to an embodiment of the present invention, the contact of the positively charged droplets and the negatively charged droplets forms the artificial ligament fiber with orientation of droplets to form a shield-core structure, a binary structure, or a micro-array structure.

Another objective of the present invention is to provide an artificial ligament, which is prepared by the aforementioned method.

Another objective of the present invention is to provide a fiber collection platform for interfacial polyelectrolyte complexation spinning process, comprising: a metal cabinet; a set of speed control motors, disposed on the metal cabinet; and a fiber collector, disposed in the metal cabinet; wherein the artificial ligament fiber of the aforementioned artificial ligament is collected to the fiber collection platform by interfacial polyelectrolyte complexation spinning process.

According to an embodiment of the present invention, the metal cabinet has a volume of 75 cm×33 cm×32 cm.

According to an embodiment of the present invention, the fiber collection platform for interfacial polyelectrolyte complexation spinning has a spinning speed of 5-30 mm/s.

According to an embodiment of the present invention, the fiber collection platform for interfacial polyelectrolyte complexation spinning further comprises a speed control unit, electrically connected with the set of speed control motors.

According to an embodiment of the present invention, the set of speed control motors comprise a first speed control gear motor, a second speed control gear motor matching with the first speed control gear motor, and a third speed control gear motor matching with the first speed control gear motor and the second speed control gear motor.

According to an embodiment of the present invention, the first speed control gear motor has a speed of 3-45 mm/s.

According to an embodiment of the present invention, the second speed control gear motor has a rate of 40-2.5 r/min.

According to an embodiment of the present invention, the third speed control gear motor has a rate of 40-0.25 r/min.

According to an embodiment of the present invention, the fiber collector is made of a polytetrafluoroethylene (PTFE) disc with a diameter of 6 cm, and holes with a diameter of 5 cm are drilled on the PTFE disc every ¼ circle spacing interval. M5 thread is configured to install a stainless steel rod with a diameter of 5 mm and a length of 10 cm with the M5 thread on an end of the stainless steel rod. Therefore, the user can choose to install two steel rods to build a two-legged fiber bundle collector with a length of 5 cm, or install four steel rods to build a four-legged collector that continuously collects individual fiber.

According to an embodiment of the present invention, the fiber collection platform for interfacial polyelectrolyte complexation spinning further comprises a fiber twisting device.

According to an embodiment of the present invention, the fiber twisting device comprises an acrylic plate and a metal shaft connected to the acrylic plate, and the acrylic plate is formed with multiple grooves, allowing the user to adjust the distance between the copper sheets to facilitate the weaving of fibers with different lengths.

In summary, the present invention uses interfacial polyelectrolyte complexation spinning process, and equips with the self-designed fiber collection machine to produce micron and millimeter-scale fibers. Combing through the weaving method, it is made into a tailor-made artificial substitute, which is applied to artificial ligaments with high tensile strength and durability, anti-fatigue, and low creep and stress relaxation rate.

The present invention uses a special collection and arrangement design, so that the artificial ligament of the present invention has a hierarchical structure similar to that observed in natural ligaments composed of small fibers and large fibers. In the selection of fiber materials, biopolymers with high biocompatibility polysaccharides and polypeptides are used. In addition, for the application of the artificial ligament of the present invention, in order to simulate the gradient structure of the original tissue around the osteosynthetic point, the present invention specially designs a mineralized structure of hydroxyapatite (hereinafter referred to as HAp) with a concentration gradient. Biomimetic ceramic coating is used to promote the integration of scaffold and bone end, and mineralization gradient is used to avoid stress concentration at the bone-ligament interface to establish better biomechanical properties.

Furthermore, due to the mild reaction conditions of the interfacial polyelectrolyte complexation spinning used in the method for preparing the artificial ligament, the fibers made can highly preserve the bioactivity of the encapsulated therapeutic factor (growth factor). In the artificial fiber, growth factors that can promote cell differentiation would be further loaded, and encapsulated inside the artificial fiber to prevent excessive and rapid release, so as to achieve long-term therapeutic effect. At the same time, the present invention can maximize the high combination and good drug encapsulation ability of the prepared artificial fiber, so that the artificial fiber can produce more complex pattern appearance and the distribution of therapeutic factors (growth factors) can be regulated.

BRIEF DESCRIPTION OF THE DRAWINGS

The following drawings form part of the present specification and are included here to further demonstrate some aspects of the present invention, which can be better understood by reference to one or more of these drawings, in combination with the detailed description of the embodiments presented herein.

DETAILED DESCRIPTION OF THE PREFERRED EMBODIMENT

In the following detailed description of the embodiments of the present invention, reference is made to the accompanying drawings, which are shown to illustrate the specific embodiments in which the present disclosure may be practiced. These embodiments are provided to enable those skilled in the art to practice the present disclosure. It is understood that other embodiments may be used and that changes can be made to the embodiments without departing from the scope of the present invention. The following description is therefore not to be considered as limiting the scope of the present invention.

Definition

As used herein, the data provided represent experimental values that can vary within a range of ±20%, preferably within ±10%, and most preferably within ±5%.

Unless otherwise stated in the context, "a", "the" and similar terms used in the specification (especially in the following claims) should be understood as including singular and plural forms.

According to the present invention, the definition of the term "interfacial polyelectrolyte complexation spinning (IPC spinning)" can be referred to Do, Minjae, et al. *Advanced Functional Materials* 27.42 (2017): 1702017; LIN, Yufan, et al. *Journal of Materials Research*, 2020, 35.2: 122-131; Domingues, Rui M A, et al. *Tendon Regeneration*. Academic Press, 2015. 259-280.

According to the present invention, the term "α-poly-D-lysine (PDL)" refers to a positively charged polymer with a molecular weight of about 70,000-150,000. Poly(amino acids) are very helpful for cells to adhere.

According to the present invention, the term "pectin" is a negatively charged polysaccharide polymer with high mechanical properties, anti-inflammatory properties, hydroxyapatite nucleation catalyst, and osteogenic differentiation-stimulating properties.

According to the present invention, the term "hierarchical structure" means that higher hierarchy of tissues is built up from lower hierarchy, that is, from small fine fibers to thick large fibers, which are aggregated into large fiber bundles.

Example 1

Preparation of Artificial Ligament

The present example illustrates the process of using the method of the present invention to prepare the artificial ligament. The method steps of this example are briefly shown in FIG. 1. The materials used in this example are shown in Table 1 below.

TABLE 1

| Chemical | M.W. (g/mol) | Brand | Cat# | Storage |
| --- | --- | --- | --- | --- |
| Pectin LM 35 | — | Taiwan Gum Arabic Company | — | RT |
| α-Poly-D-Lysine (PDL) | 84,000 | Alamanda Polymers | 27964-99-4 | −20° C. |
| N-(3-Dimethylaminopropyl)-N'-ethyl carbodiimide (EDC) | 155.2 | Sigma | 03450 | 4° C. |
| N-Hydroxysuccinimide (NHS) | 115.1 | Fluka | FL-56480 | RT |
| 2-(N-morpholino)ethanesulfonic acid (MES) | 195.2 | Sigma | SI-M2933 | RT |
| Sodium Chloride (NaCl) | 58.44 | JTBaker | JT-3624-69 | RT |
| Calcium hydroxide (Ca(OH)$_2$) | 74.093 | Sigma | RD-31219-100G | RT |
| Diammonium phosphate ((NH$_4$)$_2$HPO$_4$) | 132.06 | Merck | 101207 | RT |
| Glacial acetic acid (99.8%) | — | JTBaker | JT-9508-01 | RT |
| SurgiAid ® collagen | — | Maxigen Biotech Inc. | — | RT |

The detailed procedure of this example is as follows. Part 1: Preparation of polyelectrolyte solution. 0.02 g pectin powder is dissolved in 1 mL of deionized water and 0.02 g α-poly-D-lysine (PDL) powder is dissolved in 1 mL of deionized water water, respectively, at room temperature. The solution is stirred until homogeneous. The solution is sterilized with 0.22 um polyfluortetraethylene (PTFE) filter membrane for further use.

Part 2: See FIG. 1 for interfacial polyelectrolyte complexation spinning (IPC spinning). 1. Dispense five sets of positively and negatively charged polyelectrolyte solution in the desired pattern on the loading plate. (Here, we use a pattern of four drops on the outside and one drop on the inside (see A of FIG. 2)). We have also tried other patterns as shown in B and C of FIG. 2. 2. Lower down the fiber formation platform to make the two oppositely charged electrolyte solution contact together and form an interface between the two droplets. 3. Rise the fiber formation platform, and the IPC fibers are be successfully produced. 4. When the length of the fiber reaches 5 cm, turn on the motor of the loading plate to rotate the loading plate and form an intersection point of five fibers. 5. Dispense a droplet of fusion solution to fuse the above-mentioned five fibers into one fiber bundle (i.e., primary bundle). 6. As the fiber formation platform reaches the height of the collector device, stop the movement of the fiber formation platform and install the 7-cm-long collector device for fiber collection. 7. Turn on the motor of the collector device to automatically collect and assemble the fibers (i.e., secondary bundles). 8. Repeat steps 2-7 for 5 times; then, a fiber fascicle with a length of 7 cm and a diameter of 1 mm can be obtained. 9. Repeat steps 2-8 for 5 times to obtain five fiber fascicles. 10. Collect and stack five fiber fascicles together to prepare a ligament-like fiber scaffold with a length of 7 cm and a diameter of around 3 mm.

Part 3: See twisting in FIG. 1. 0.5 g EDC and 0.2 mg NHS are dissolved in 10 mL of MES buffer (0.1M MES and 0.5M NaCl, pH 6.5) to prepare a crosslinking solution. The scaffold is placed on the fiber-twisting device. The fiber-twisting device is rotated to wind the fiber bundles (45°/cm). The scaffold is rinsed with the crosslinking solution for preliminary crosslinking for 1 hour.

Part 4: See strengthening and crosslinking in FIG. 1. The twisted scaffold is immersed into the crosslinking solution for 4 hours to further strengthen the mechanical stability of the scaffold. After 4 hours, the crosslinked scaffold is washed with deionized water for 3 times to remove residual EDC and NHS.

Figure 1:
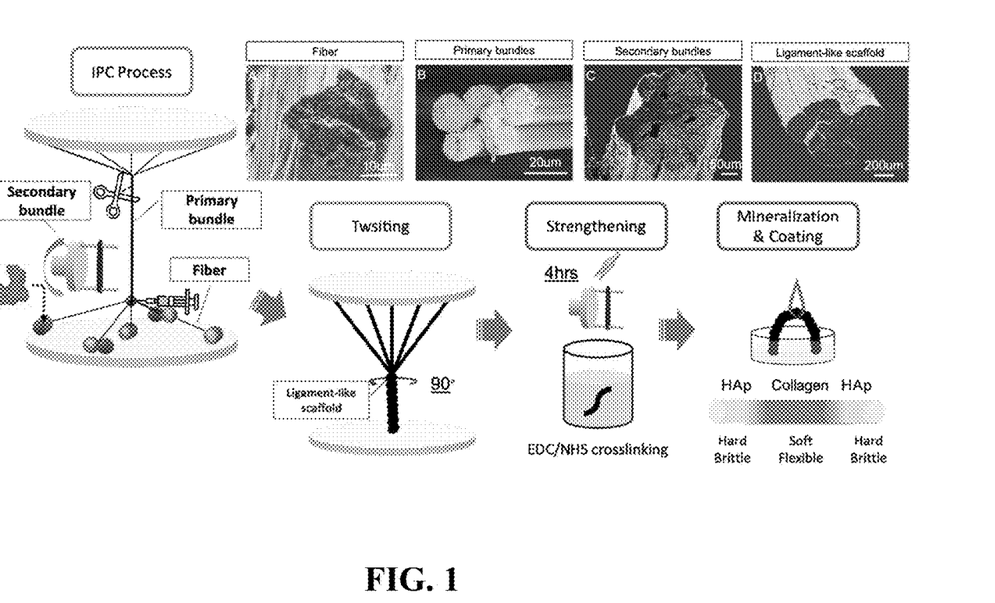
FIG. 1 shows the steps of the method for preparing an artificial ligament according to the present invention, in which IPC represents interfacial polyelectrolyte complexation, EDC represents N-(3-Dimethylaminopropyl)-N'-ethyl carbodiimide, NHS represents N-hydroxysuccinimide, and HAp represents hydroxyapatite.

Part 5: See mineralization and coating in FIG. 1. Calcium hydroxide and diammonium hydrogen phosphate solutions are mixed together to form a hydroxyapatite (HAp) coating (i.e., mineralization treatment). See the reaction below:

Two ends of the scaffold are stabilized with surgical suture, and 25 mL 0.5M Ca(OH)$_2$ solution and 25 mL 0.3M (NH$_4$)

$_2$HPO$_4$ solution in deionized water are prepared. Ca(OH)$_2$ solution and (NH$_4$)$_2$HPO$_4$ solution are warmed up to 37° C. (NH$_4$)$_2$HPO$_4$ is slowly added to Ca(OH)$_2$ at 37° C. under stirring at 300 rpm to prepare the HAp coating solution. Both ends of the scaffold are immediately immersed in HAp coating solution for 12 hours, and the HAp coating solution is allowed to evaporate. After 12 hours, a graded HAp coating at each end is successfully constructed.

Part 6: See mineralization and coating in FIG. 1. Collagen (such as type I collagen) is used for coating. SurgiAid® collagen is dissolved in acetic acid solution and the solution is stirred overnight to prepare a 2 wt % collagen coating solution. The scaffold is placed on a slot-shape polydimethylsiloxane (PDMS) mold. 1 mL pipette tips are used to sheath and protect the HAp-coated portions of the scaffold, the collagen coating solution is applied evenly over the middle portion of the scaffold, and the scaffold is air-dried in the laminar flow hood.

Figure 2:
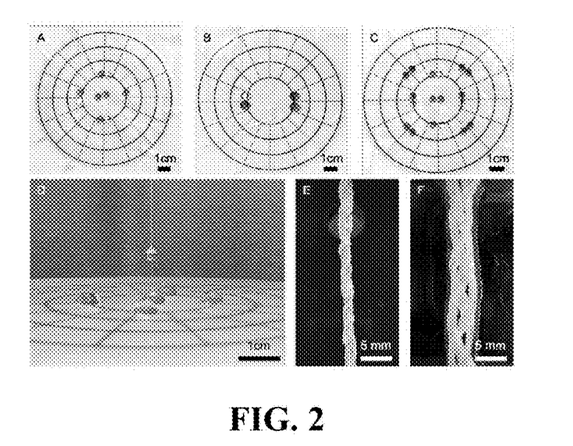
FIG. 2 shows different droplet patterns loaded for interfacial polyelectrolyte complexation spinning (IPC spinning).

Formed by arrayed droplet arrangement such as: core-shield, binary, and micro-array, continuous micron fiber bundles with micro-geometric arrangement can be produced. According to different application strategies, users can adjust the required fiber microstructure by themselves, and even skip the arrayed arrangement, and use the instrument more flexibly. At the same time, this example also verifies that under this instrument framework, the interfacial polyelectrolyte complexation spinning fibers can have flexible macroscopic weaving properties. D-E in FIG. 2 are the morphology of the sample produced with the aid of the instrument, showing that the equipment can continuously enlarge the fiber to serve as a biomedical material with a macroscopic centimeter (cm) size. At the same time, it is worth noting that the fiber bundles produced by this instrument still have the processing characteristics of weaving, and can be further braided and strengthened to achieve the macroscopic material morphology of the desired application (see F of FIG. 2).

Type I collagen is selected as the sheath material for ligament application as the main component of natural ligament. The alpha helix structure of collagen can provide the elasticity required by the scaffold, so that the graft added with collagen sheath has the mechanical properties of resisting mechanical fatigue. At the same time, the RGD amino acid sequence on the collagen can attract the integrin αVβ3 connection of the cell to enhance cell adhesion. The addition of the protein sheath can help the integration of the graft and the tissue, so that the integration effect of the scaffold and the tissue in the body is better.

Example 2

Figure 3:
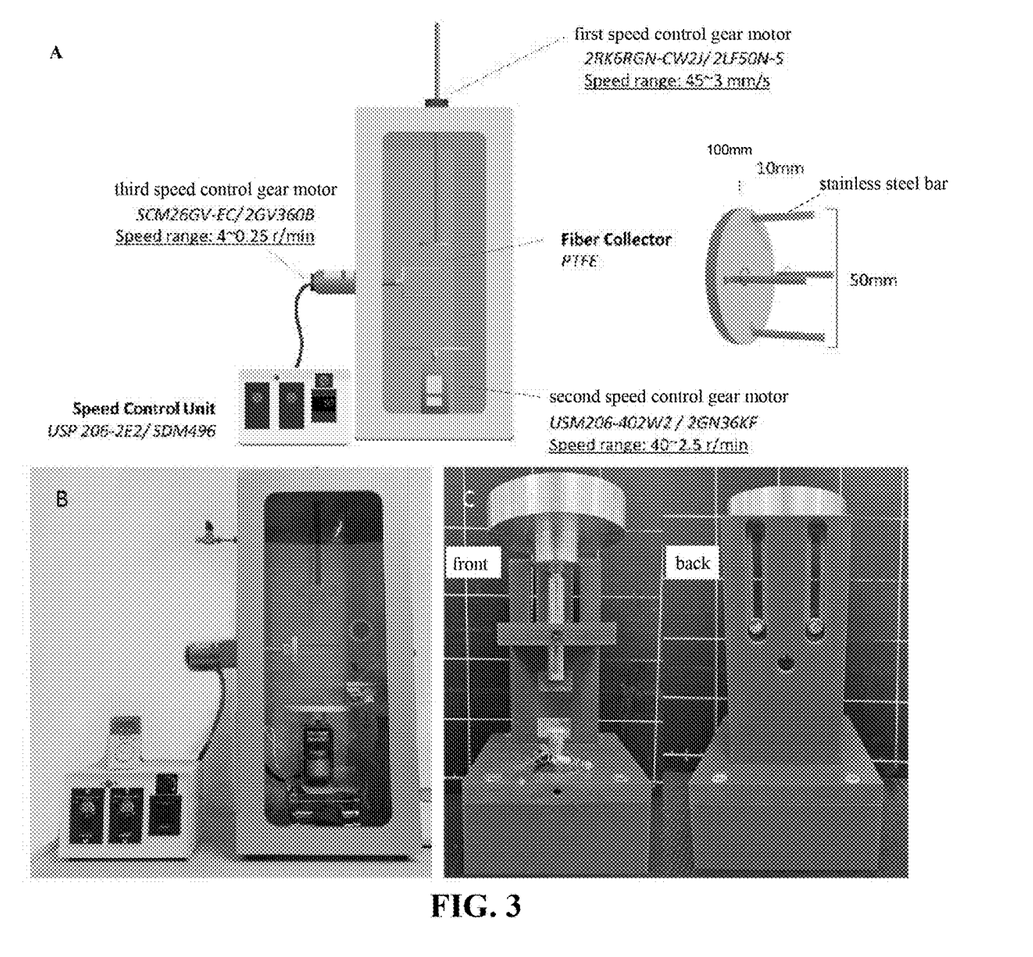
FIG. 3 shows the fiber collection platform equipment for interfacial polyelectrolyte complexation spinning, in which PTFE represents polyfluortetraethylene.

Fiber Collection Platform Equipment for Interfacial Polyelectrolyte Complexation Spinning The fiber collection platform equipment for interfacial polyelectrolyte complexation spinning established by the present invention is assembled by the following mechanisms, see FIG. 3A schematic diagram and FIG. 3B for instrument photos. The main body of the equipment is transformed from a 75 cm×33 cm×32 cm metal cabinet, which can be well sealed to reduce the chance of contamination of biological samples, and at the same time, the internal spinning situation can be observed through the front transparent door. Through experimental tests, the interfacial polyelectrolyte complexation spinning can stabilize the critical speed of the spinning and the concentration of polyelectrolyte is related to the properties, which is about 5-30 mm/s. Therefore, this instrument is equipped with a set of speed control motors that meet the drawing rate to provide stable and continuous spinning conditions. All motor control of this instrument is integrated in USP 206-2E2/SDM496 speed control unit for control. In the fiber generation stage, 2RK6RGN-CW2J/2LF5ON-5 speed control linear gear motor (i.e., the first speed control gear motor) is used, which can control the fiber forming platform in the Z-axis direction at 3-45 mm/s. In the fusion stage, the USM206-402W2/2GN36KF speed control gear motor (i.e., the second speed control gear motor) is used to rotate the loading plate at a speed of 40-2.5 r/min to fuse the fibers into primary fiber bundles. In the continuous collection stage, the SCM26GV-EC/2GV360B speed control gear motor (i.e., the third speed control gear motor) to rotate the collector at a rate of 40-0.25 r/min in the vertical direction to continuously collect the primary fiber bundles and generate secondary fiber bundles. In this step, the fiber collector is made of a PTFE disc with a diameter of 6 cm, and holes are drilled on the disc every ¼ circle with a diameter of 5 cm. M5 thread is configured to install a stainless steel rod with a diameter of 5 mm and a length of 10 cm with the M5 thread on an end of the stainless steel rod. Therefore, the user can choose to install two rods to build a two-legged fiber bundle collector with a length of 5 cm, or install four rods to build a four-legged collector that continuously collects individual fiber. At the same time, in order to stabilize the reaction humidity of interfacial polyelectrolyte complexation spinning, a humidifier and hygrometer are placed in the metal cavity to make the internal humidity reach more than 90%.

In addition, for subsequent twisting weaving, the present invention has designed a twisting device (see FIG. 3C) simultaneously, which can assist the stability of weaving. The main body is composed of an acrylic plate and a metal shaft is used to twist and braid the fiber bundles. The fiber bundles would be fixed on the upper and lower shafts with copper sheets. Due to the special design of the two grooves behind the acrylic backplane, users can adjust the distance between the copper sheets to facilitate the weaving of fibers of different lengths.

Example 3

Hierarchical Structure of Artificial Ligament

Figure 4:
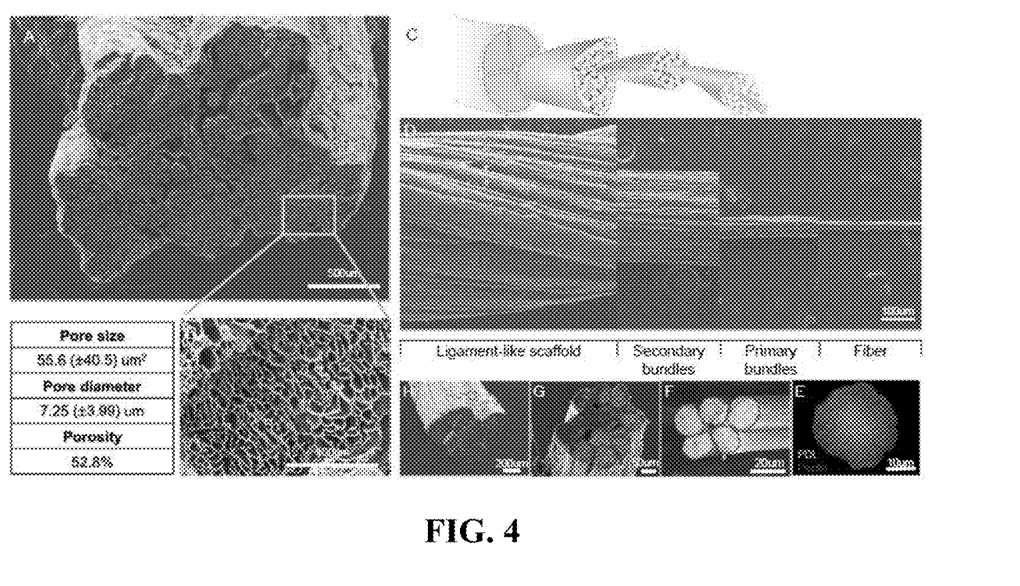
FIG. 4 shows the hierarchical structure of the artificial ligament, in which PDL represents α-poly-D-lysine.

This example investigates the hierarchical structure of the artificial ligament. The result is shown in FIG. 4. It can be seen from FIG. 4 that A is the section of the artificial ligament after freeze-drying treatment. It can be observed that the macroscopic artificial ligament is composed of smaller-scale fibers, which conforms to the characteristics of the hierarchical structure "higher hierarchy of tissues is built up from lower hierarchy of structure." C is a schematic diagram of the hierarchical structure of human ligaments, which can show that the fiber microstructure of D has similar hierarchy, and the fiber profile of E shows that the high hierarch of fiber bundles are closely combined with low hierarch of fibers or fiber bundles.

Example 4

Mineralization of Artificial Ligament

Figure 5:
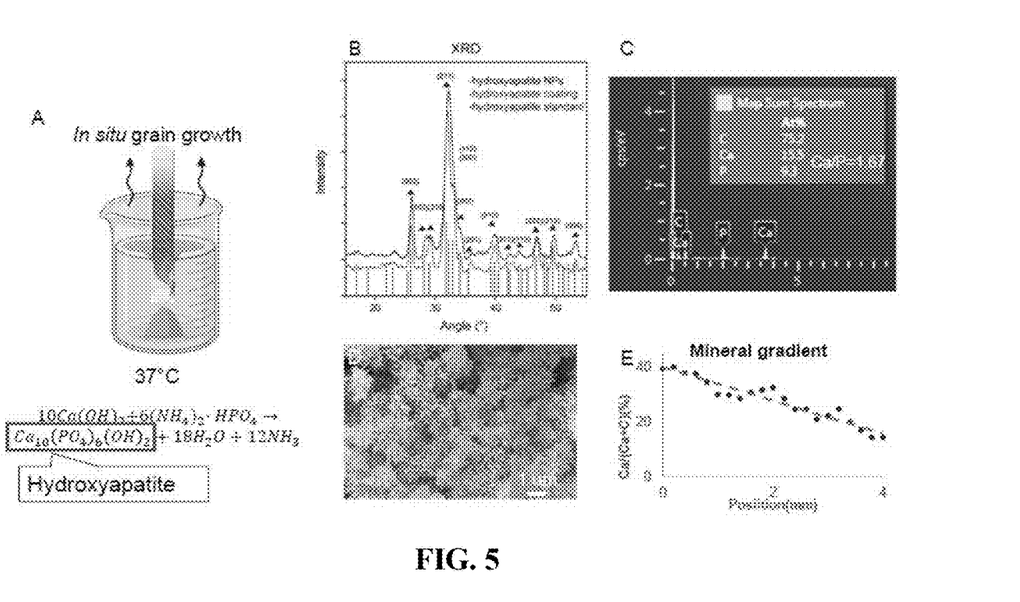
FIG. 5 shows the mineralization treatment of the artificial ligament, in which XRD represents X-ray diffraction, and NPs represent nanoparticles.

This example investigates the mineralization of the artificial ligament. The result is shown in FIG. 5. It can be seen from FIG. 5 that through the deposition of Ca(OH)$_2$ and (NH$_4$)$_2$HPO$_4$, hydroxyapatite (HAp) was successfully deposited at both ends of the fiber in the form of a concentration gradient to form a mineralization gradient structure. A of FIG. 5 is a schematic diagram of the reaction equation and mineralization steps. B of FIG. 5 is an X-ray diffraction analysis. It can be measured that the diffraction pattern of the mineralized layer on the fiber surface conforms to the standard characteristic peak of HAp, which proves that the mineralized layer has the crystal structure of HAp. FIG. 5C is the semi-quantitative result of the elements of energy dispersive X-Ray analysis (EDX), the result can show that the mineralized layer has the characteristics of HAp, and the ratio of calcium to phosphorus is 1.67. FIG. 5D is the SEM image of the mineralized layer, and it can be observed that there are HAp crystals on the surface. FIG. 5E is an electron spectrometer analysis (ESCA) for chemical analysis, from which we can know the distribution of calcium/carbon ratio at different positions, in which calcium is one of the components of HAp, and carbon is one of the components of IPC. It can be proved that the mineralization gradient of HAp has a gradient distribution that simulates bone joints.

Example 5

Analysis of Mechanical Properties of Artificial Ligament

Figure 6:
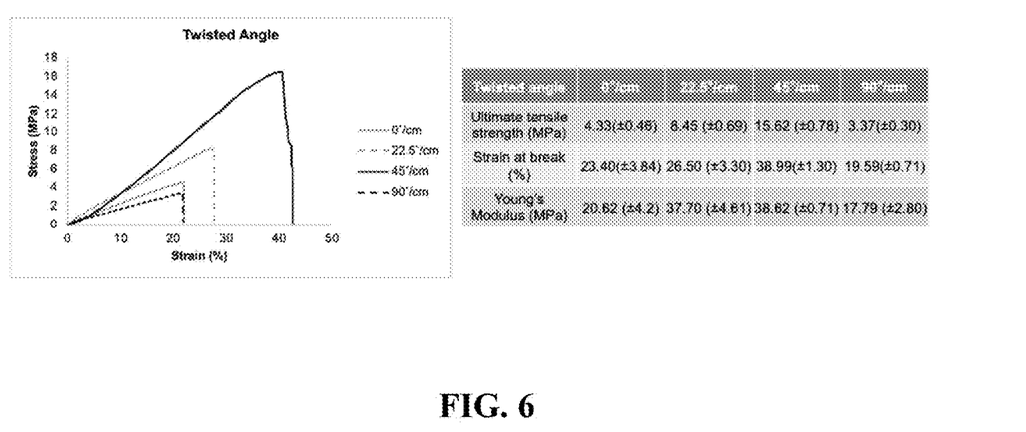
FIG. 6 shows the analysis of the mechanical properties of the artificial ligament.

This example investigates the analysis of the mechanical properties of the artificial ligament through tensile testing. In order to integrate the fiber bundles and increase the fiber strength, this example uses a twisting device for reinforcement. The result in FIG. 6 shows that after twisting at 45°/cm, the tensile strength has been significantly improved, which can exceed the ultimate stress of 6 MPa that the anterior cruciate ligament would bear during daily walking.

Example 6

Viscoelastic Analysis of Artificial Ligament

Figure 7:
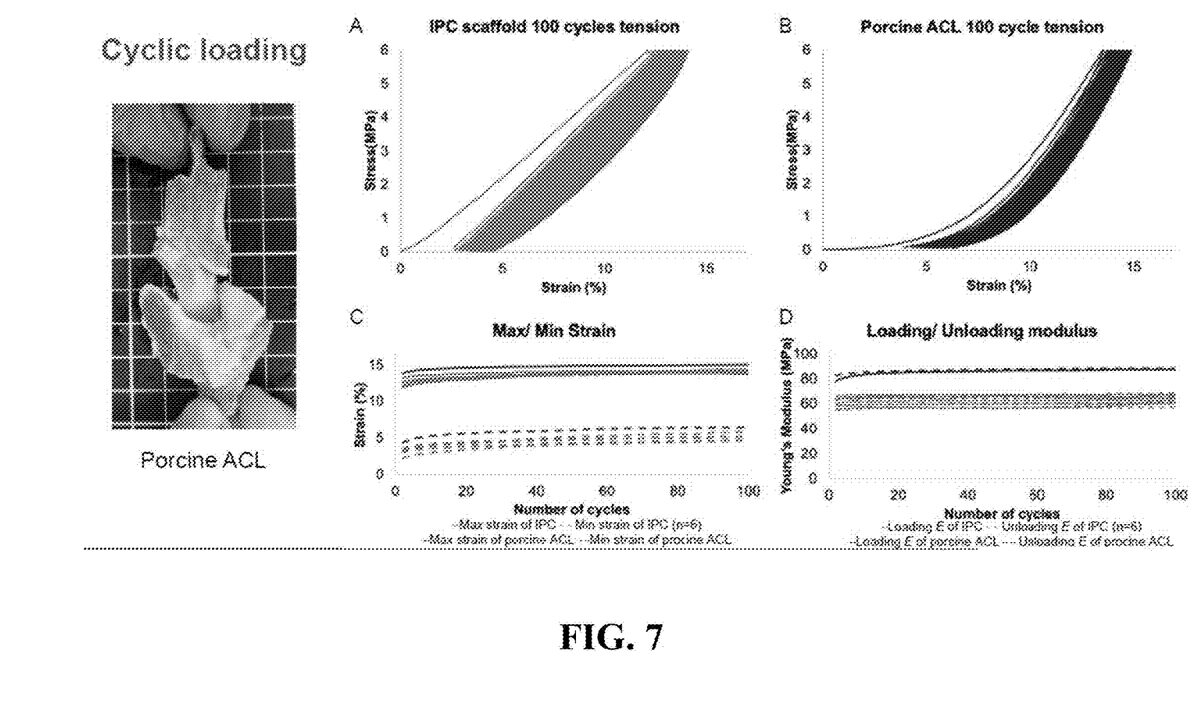
FIG. 7 shows the viscoelastic analysis of the artificial ligament by cyclic loading/unloading, in which IPC represents interfacial polyelectrolyte complexation.

This example investigates the viscoelastic analysis of the artificial ligament by cyclic loading/unloading. The result is shown in FIG. 7. It can be seen from FIG. 7 that the collagen-coated artificial ligament exhibits fatigue-resistant mechanical properties under short-term cyclic stretching. As can be seen in A and B of FIG. 7, it can exhibit mechanical properties similar to those of the anterior cruciate ligament in vivo under the cyclic stretching of the peak stress of 6 MPa after 100 human walks. The species used here is porcine. In addition, the maximum/minimum strain and loading/unloading modulus are calculated separately in C and D of FIG. 7, and it can be known that the artificial ligament has fatigue resistance similar to that of native tissue, and it still maintains stable characteristics after repeated stretching cycles.

Example 7

Another Viscoelastic Analysis of Artificial Ligament

Figure 8:
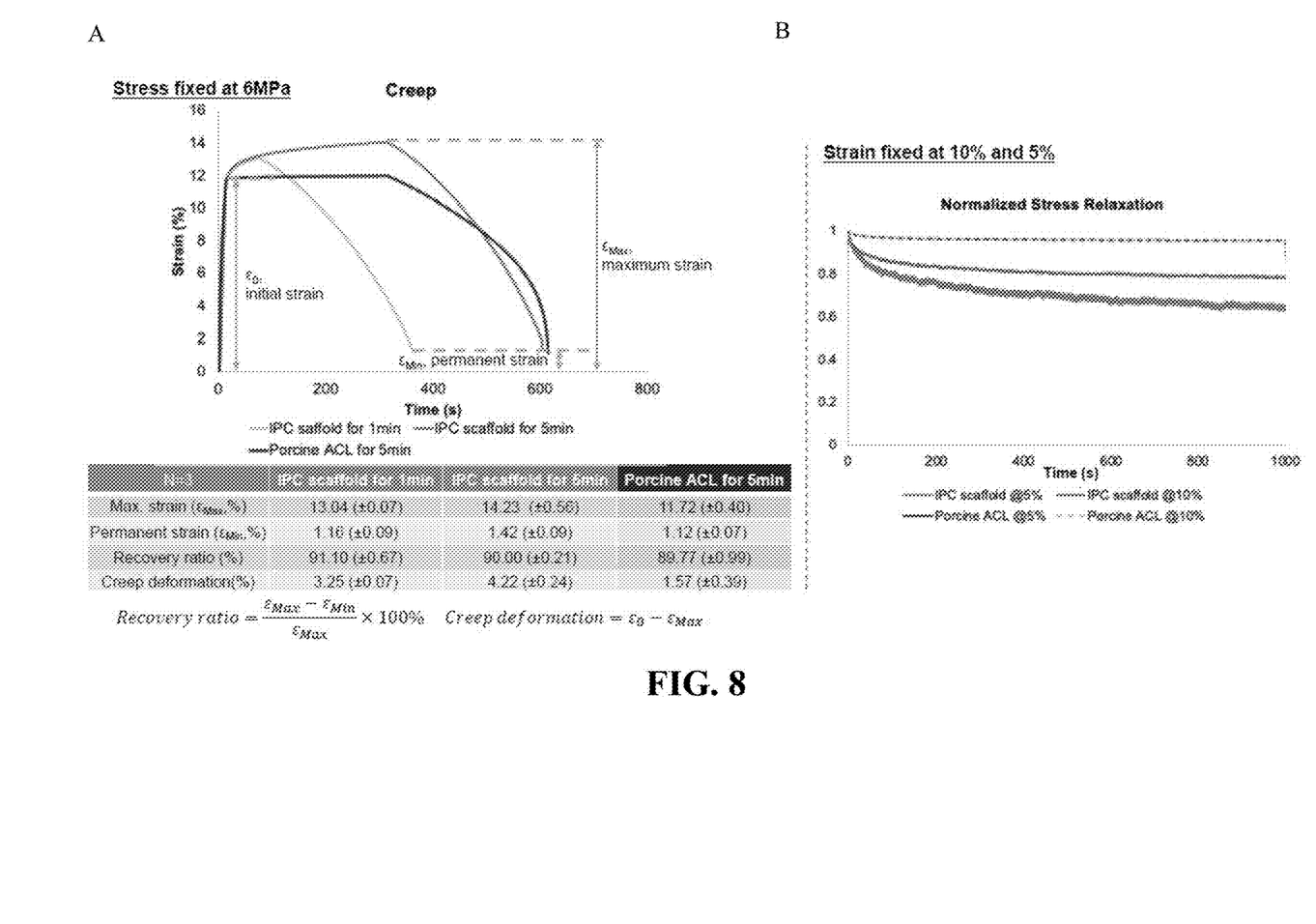
FIG. 8 shows another viscoelastic analysis of the artificial ligament by creep and stress relaxation, in which IPC represents interfacial polyelectrolyte complexation, and ACL represents anterior cruciate ligament.

This example investigates another viscoelastic analysis of the artificial ligament by creep and stress relaxation. The result is shown in FIG. 8. It can be seen from FIG. 8 that the collagen-coated artificial ligament also exhibits fatigue-resistant mechanical properties under long-term cyclic stretching. A of FIG. 8 compares the prepared artificial ligament with the porcine-derived anterior cruciate ligament. It is found that it lasts for five minutes under peak stress, has only a small amount of creep, and has a high recovery rate comparable to native tissue after unloading. In B of FIG. 8, the artificial ligament and the porcine-derived anterior cruciate ligament were placed under the peak strain for 1000 seconds, and only a small amount of stress relaxation occurred.

Example 8

Degradation and Drug Release Profile of Artificial Ligament

Figure 9:
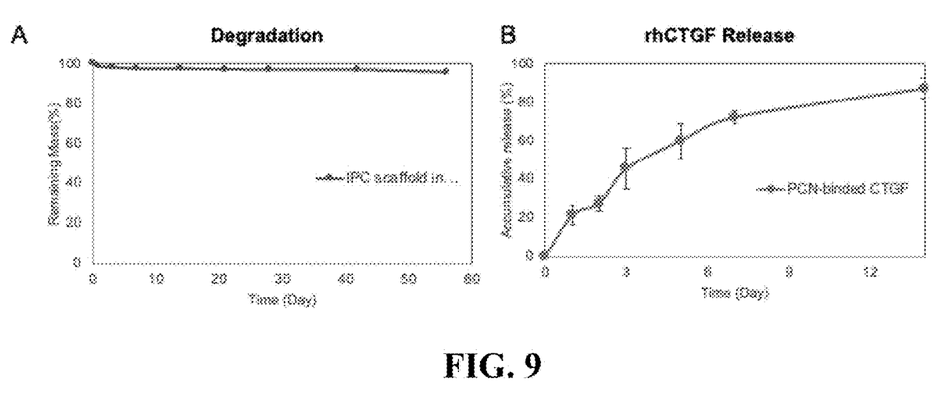
FIG. 9 shows the degradation and growth factor release profile of the artificial ligament, in which CTGF represents connective tissue growth factor, and PDL represents α-poly-D-lysine.

This example investigates the degradation and drug release profile of the artificial ligament. The result is shown in FIG. 9. It can be seen from A of FIG. 9 that the artificial ligament exhibits long-lasting properties under 37° C. immersion in normal saline, and can exist stably in a simulated physiological environment for more than two months, demonstrating its compatibility with the slow repair of ligaments. B of FIG. 9 shows the slow release of connective tissue growth factor (CTGF) in vitro by polyelectrolyte complex nanoparticle (PCN) grafting, which can be released slowly in normal saline at 37° C. for more than one week.

Example 9

In Vitro Biocompatibility Test of Artificial Ligament

Figure 10:
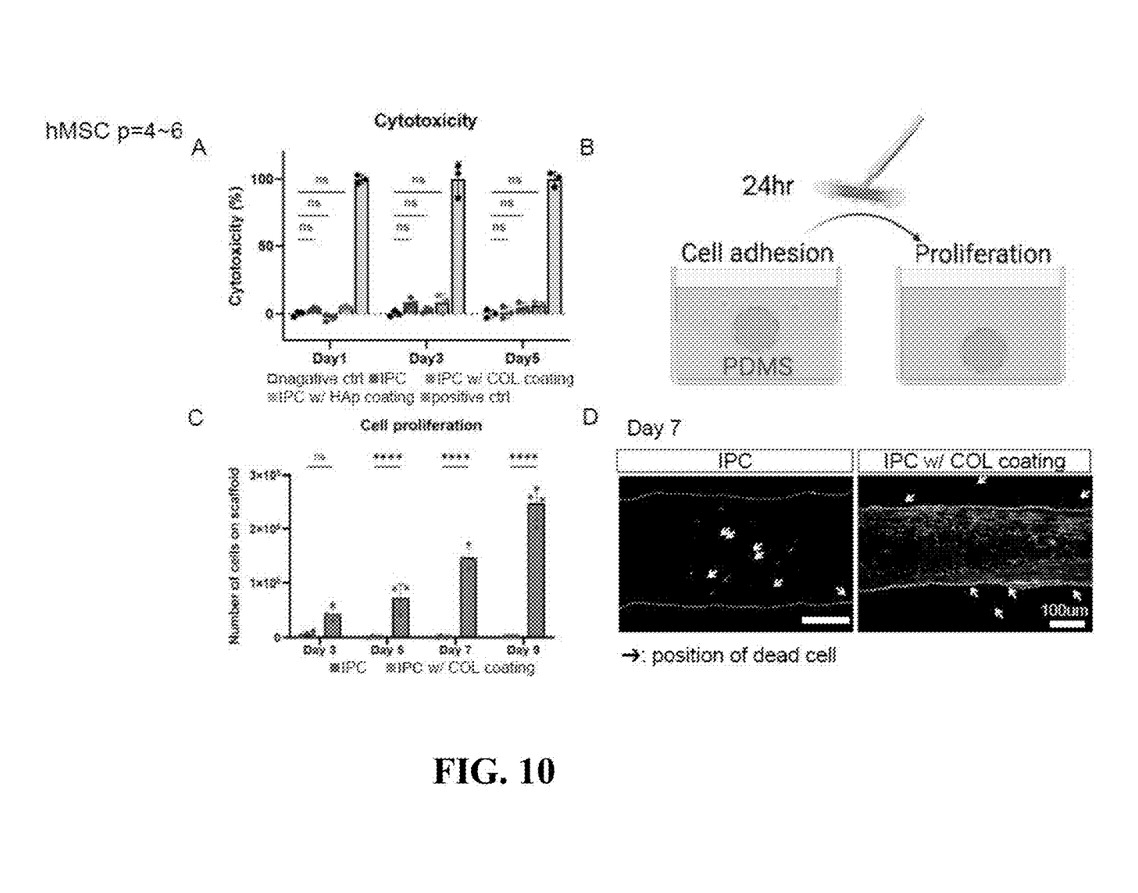
FIG. 10 shows the in vitro biocompatibility test of the artificial ligament, in which hMSC represents human mesenchymal stem cell, IPC represents interfacial polyelectrolyte complexation, COL represents collagen, ns represents not significant, HAp represents hydroxyapatite, and PDMS represents polydimethylsiloxane.

This example investigates the in vitro biocompatibility test of the artificial ligament. The result is shown in FIG. 10. It can be seen from A of FIG. 10 that pure IPC fibers, IPC fibers coated with collagen and IPC fibers mineralized by HAp, after co-cultured with human mesenchymal stem cells, do not have biotoxicity, that is, they have good biocompatibility. At the same time, the artificial ligament shows a promoting effect on cell adhesion and proliferation. B of FIG. 10 is a schematic diagram of the adhesion experiment, and C and D of FIG. 10 show that after collagen coating and hydroxyapatite mineralization, the artificial ligament has a higher amount of cell adhesion.

In summary, the present invention uses interfacial polyelectrolyte complexation spinning process, and equips with the self-designed fiber collection machine to produce micron and millimeter-scale fibers. Combing through the weaving method, it is made into a tailor-made artificial substitute, which is applied to artificial ligaments with high tensile strength and durability, anti-fatigue, and low creep and stress relaxation rate.

Although the present invention has been described with reference to the preferred embodiments, it will be apparent to those skilled in the art that a variety of modifications and changes in form and detail may be made without departing from the scope of the present invention defined by the appended claims.

What is claimed is:

1. A method for preparing an artificial ligament, comprising the following steps:
   (a) forming an artificial ligament fiber through interfacial polyelectrolyte complexation spinning (IPC spinning) process, wherein the artificial ligament fiber is formed by spinning on a fiber collection platform by the interfacial polyelectrolyte complexation spinning process using a positively charged poly(amino acids) polymer material and a negatively charged polysaccharide polymer material;
   (b) weaving the artificial ligament fiber using a twisted weaving method to form an artificial fiber bundle;
   (c) using a crosslinking agent to strengthen the artificial fiber bundle, thereby forming a strengthened artificial fiber bundle; and
   (d) creating a mineralization gradient on the strengthened artificial fiber bundle, and using a protein as a sheath for coating layer, thereby forming the artificial ligament with its fundamental characteristics and structure;
   wherein in step (a), the positively charged poly(amino acids) polymer material and the negatively charged polysaccharide polymer material are respectively in a form of positively charged droplets and negatively charged droplets, and the positively charged poly (amino acids) polymer material and the negatively charged polysaccharide polymer material are dropped on the fiber collection platform, and the artificial ligament fiber is fabricated by contact of the positively charged droplets and the negatively charged droplets through pulling upward.

2. The method according to claim 1, wherein the positively charged poly(amino acids) polymer material is α-poly-D-lysine (PDL).

3. The method according to claim 1, wherein the negatively charged polysaccharide polymer material is pectin.

4. The method according to claim 1, wherein in step (b), the twisted weaving method is formed by twisting five strands at 45°/cm.

5. The method according to claim 1, wherein in step (c), the crosslinking agent comprises N-(3-Dimethylaminopropyl)-N'-ethyl carbodiimide (EDC) and N-hydroxysuccinimide (NHS).

6. The method according to claim 1, wherein in step (d), the protein is type I collagen.

7. The method according to claim 1, wherein in step (d), the mineralization gradient is created by adding calcium hydroxide and diammonium hydrogen phosphate solution to form hydroxyapatite.

8. The method according to claim 1, wherein an amount of the positively charged droplets or the negatively charged droplets is five drops.

9. The method according to claim 1, wherein the contact of the positively charged droplets and the negatively charged droplets forms the artificial ligament fiber with orientation of droplets to form a shield-core structure, a binary structure, or a micro-array structure.

* * * * *